(12) United States Patent
Shilliday et al.

(10) Patent No.: US 7,137,341 B2
(45) Date of Patent: *Nov. 21, 2006

(54) DISTRIBUTED CHARGE INFLATOR SYSTEM

(75) Inventors: David Shilliday, Phoenix, AZ (US); Gregory J. Scaven, Mesa, AZ (US); Kevin Fitzgerald, Mesa, AZ (US)

(73) Assignee: Zodiac Automotive US Inc., Tempe, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/458,179

(22) Filed: Jun. 11, 2003

(65) Prior Publication Data

US 2003/0226468 A1    Dec. 11, 2003

Related U.S. Application Data

(63) Continuation-in-part of application No. 10/146,933, filed on May 17, 2002, now Pat. No. 6,886,469.

(51) Int. Cl.
C06D 5/00 (2006.01)

(52) U.S. Cl. ............ 102/530; 102/531; 280/728.1

(58) Field of Classification Search ......... 102/530, 102/537; 280/728.1, 729, 733, 736, 737, 280/743
See application file for complete search history.

(56) References Cited

U.S. PATENT DOCUMENTS

| | | | |
|---|---|---|---|
| 3,532,359 A | 10/1970 | Teague et al. |
| 3,606,377 A | 9/1971 | Martin |
| 3,724,870 A | 4/1973 | Kurokawa et al. |
| 3,776,570 A | 12/1973 | Weman |
| 4,136,894 A | 1/1979 | Ono et al. |
| 4,200,615 A | 4/1980 | Hamilton et al. |
| 4,902,036 A | 2/1990 | Zander et al. |
| 4,923,212 A | 5/1990 | Cuevas |
| 4,950,458 A | 8/1990 | Cunningham |
| 4,998,751 A | 3/1991 | Paxton et al. |
| 5,078,422 A | 1/1992 | Hamilton et al. |
| 5,101,729 A | 4/1992 | Noble et al. |
| 5,125,684 A | 6/1992 | Cartwright |
| 5,131,680 A | 7/1992 | Coultas et al. |
| 5,219,178 A | 6/1993 | Kobari et al. |
| 5,249,824 A | 10/1993 | Swann et al. |
| 5,282,648 A | 2/1994 | Peterson |
| 5,299,828 A | 4/1994 | Nakajima et al. |
| 5,322,322 A | 6/1994 | Bark et al. |
| 5,364,127 A | 11/1994 | Cuevas |
| 5,397,543 A | 3/1995 | Anderson |
| 5,403,035 A | 4/1995 | Hamilton |
| 5,415,932 A | 5/1995 | Bishop et al. |

(Continued)

FOREIGN PATENT DOCUMENTS

DE    4134995    3/1993

(Continued)

*Primary Examiner*—Michelle Clement
(74) *Attorney, Agent, or Firm*—Kilpatrick Stockton LLP

(57) ABSTRACT

An inflatable system includes an inflatable component and an distributed charge inflator disposed in the inflatable component. The distributed charge inflator includes a first charge for generating inflating gas and a housing body connected to the first charge. The housing body includes an initiator and a second charge that has relatively long burn time. Upon receiving a signal from a sensor, the initiator ignites the first charge and the second charge simultaneously. The first charge inflates the inflatable component and the second charge sustains the inflation of the inflatable component.

17 Claims, 4 Drawing Sheets

U.S. PATENT DOCUMENTS

| | | |
|---|---|---|
| 5,423,570 A | 6/1995 | Kort et al. |
| 5,433,147 A | 7/1995 | Brede et al. |
| 5,435,594 A | 7/1995 | Gille |
| 5,443,286 A | 8/1995 | Cunningham et al. |
| 5,462,307 A | 10/1995 | Webber et al. |
| 5,464,246 A | 11/1995 | Castro et al. |
| 5,480,181 A | 1/1996 | Bark et al. |
| 5,483,896 A | 1/1996 | Hock et al. |
| 5,577,765 A | 11/1996 | Takeda et al. |
| 5,588,676 A | 12/1996 | Clark et al. |
| 5,609,210 A | 3/1997 | Galbraith et al. |
| 5,623,115 A | 4/1997 | Lauritzen et al. |
| 5,660,412 A | 8/1997 | Renfroe et al. |
| 5,670,738 A | 9/1997 | Storey et al. |
| 5,738,374 A | 4/1998 | Marsaud et al. |
| 5,820,162 A | 10/1998 | Fink |
| 5,839,754 A | 11/1998 | Schluter et al. |
| 5,868,424 A | 2/1999 | Hamilton et al. |
| 5,918,900 A | 7/1999 | Ennis |
| 5,967,550 A | 10/1999 | Shirk et al. |
| 5,970,880 A | 10/1999 | Perotto |
| 6,019,389 A | 2/2000 | Burgi et al. |
| 6,032,979 A | 3/2000 | Mossi et al. |
| 6,062,143 A | 5/2000 | Grace et al. |
| 6,066,017 A | 5/2000 | Max et al. |
| 6,073,961 A | 6/2000 | Bailey et al. |
| 6,079,740 A | 6/2000 | Barth et al. |
| 6,095,559 A | 8/2000 | Smith et al. |
| 6,106,010 A | 8/2000 | Forbes et al. |
| 6,119,474 A | 9/2000 | Augustine et al. |
| 6,123,790 A | 9/2000 | Lundstrom et al. |
| 6,227,562 B1 | 5/2001 | Shirk et al. |
| 6,237,941 B1 | 5/2001 | Bailey et al. |
| 6,237,950 B1 | 5/2001 | Cook et al. |
| 6,253,683 B1 | 7/2001 | Fukabori |
| 6,308,984 B1 | 10/2001 | Fischer |
| 6,422,599 B1 | 7/2002 | Oehm |
| 6,460,873 B1 | 10/2002 | Lebaudy et al. |
| 6,612,243 B1 | 9/2003 | Italiane et al. |
| 2003/0075904 A1 | 4/2003 | Lebaudy et al. |
| 2003/0075909 A1 | 4/2003 | Lebaudy et al. |
| 2004/0119272 A1 | 6/2004 | Rade et al. |

FOREIGN PATENT DOCUMENTS

| | | |
|---|---|---|
| DE | 4211672 | 10/1993 |
| DE | 20013405 | 2/2001 |
| DE | 10040681 | 9/2001 |
| EP | 0480085 | 4/1992 |
| EP | 00888932 | 1/1999 |
| EP | 1069005 | 1/2001 |
| JP | 01151066 | 6/1989 |
| WO | WO 94/01307 | 1/1994 |
| WO | WO 94/14637 | 7/1994 |
| WO | WO 96/40541 | 12/1996 |
| WO | WO 99/12776 A | 3/1999 |
| WO | WO 99/38725 | 8/1999 |
| WO | WO 01/34516 A2 | 5/2001 |

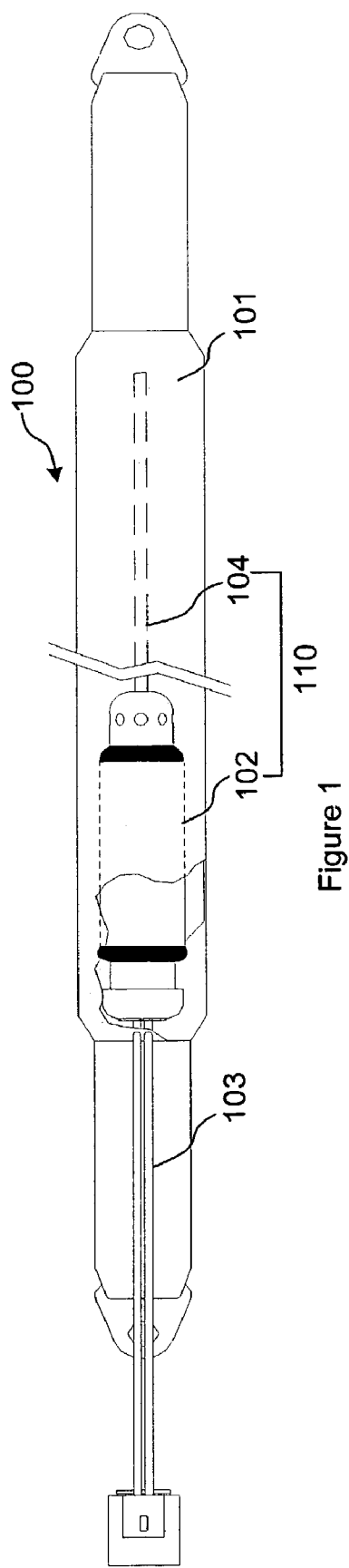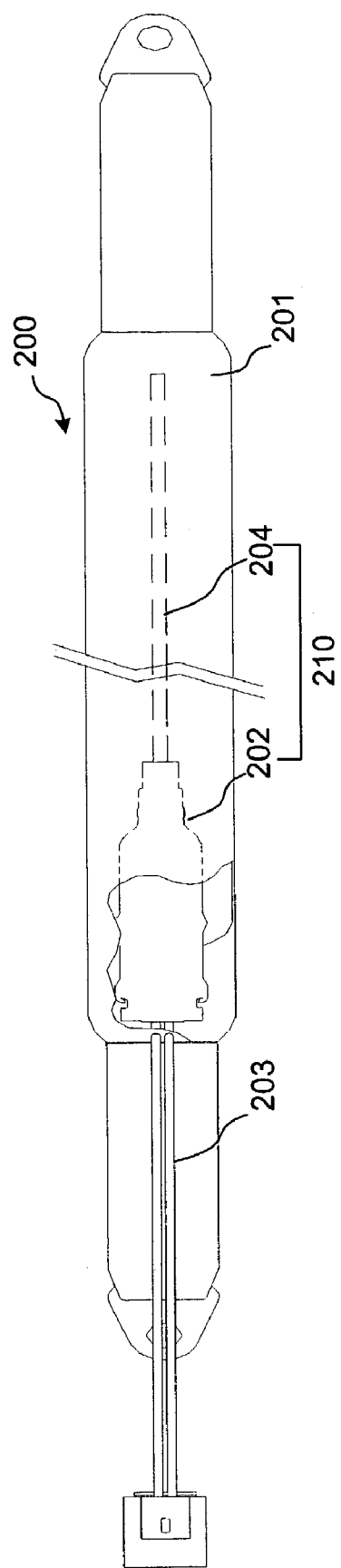

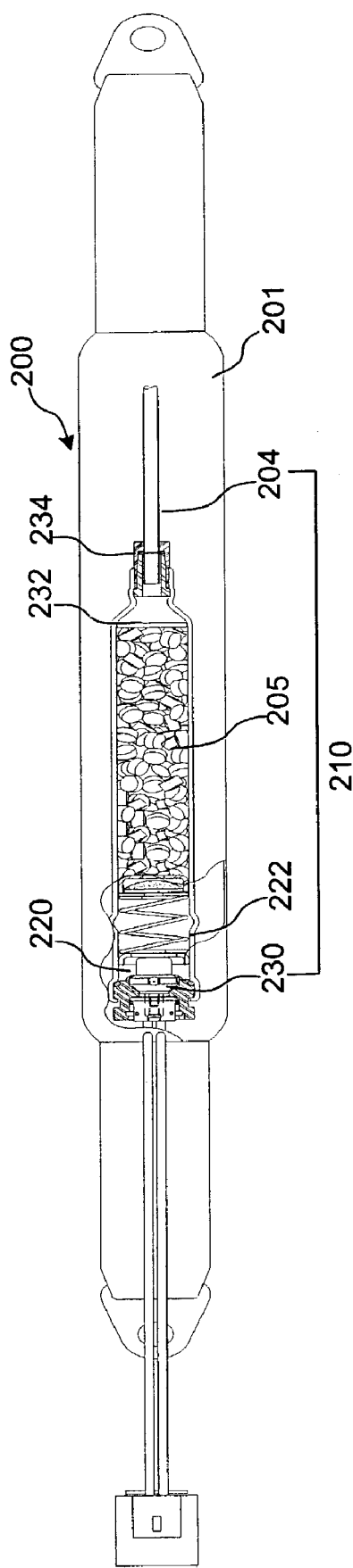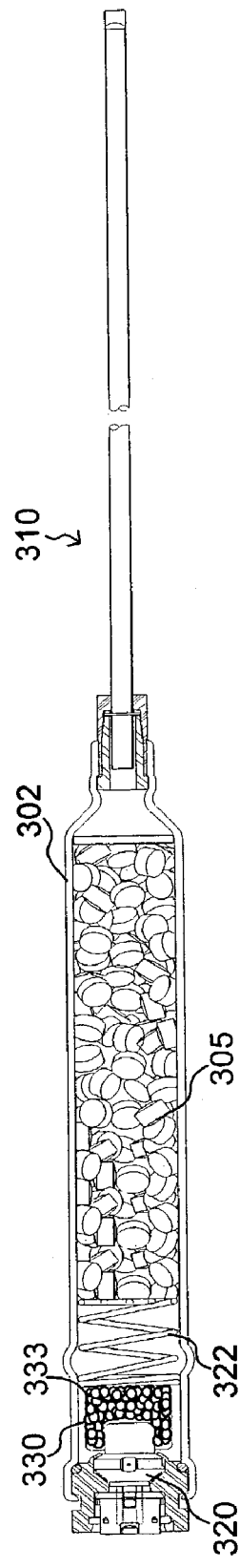

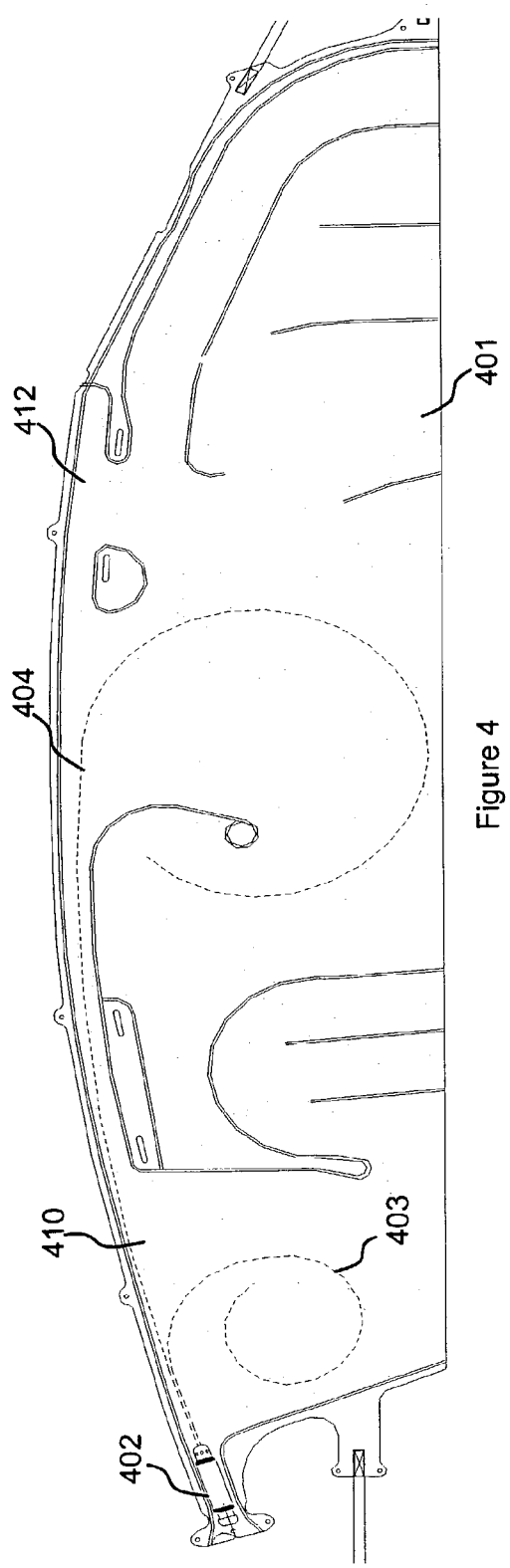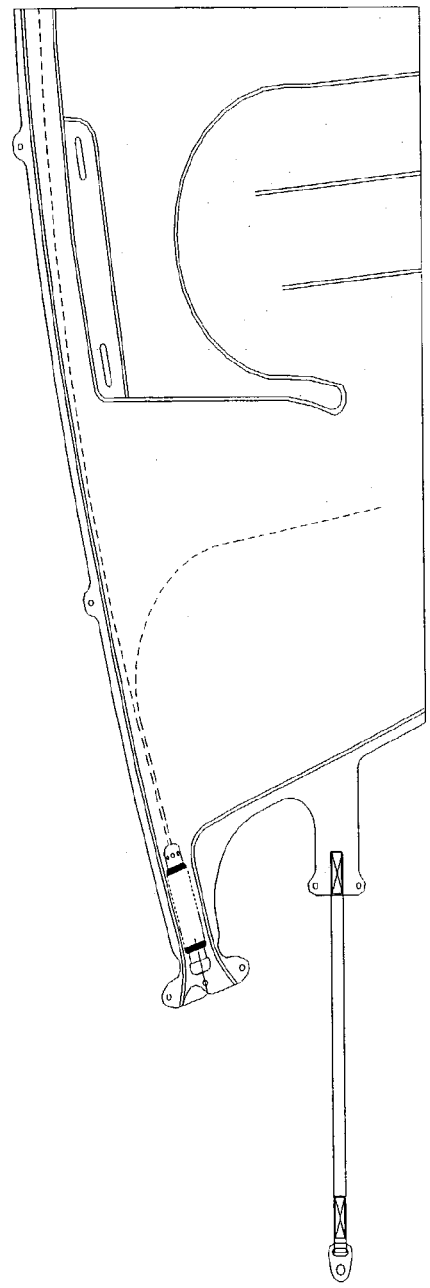
Figure 4
Figure 5

DISTRIBUTED CHARGE INFLATOR SYSTEM

This application is a continuation-in-part of U.S. patent application Ser. No. 10/146,933, filed May 17, 2002, now U.S. Pat. No. 6,886,469 which is herein incorporated by reference in its entirety.

BACKGROUND

1. Field of the Invention

The present invention relates generally to the field of gas-generating devices for inflatable systems, and particularly to those used in inflatable restraint systems.

2. Background of the Invention

Prior art inflatable systems typically use an initiator (such as an electronic squib) and a booster material (such as boron potassium nitrate) to ignite a surrounding, much larger quantity of gas-generating propellant material (such as sodium azide, potassium nitrate or ammonium nitrate, and binders). The gas-generating propellant serves as the primary means by which sufficient gas is produced to deploy the inflatable system. The initiator, the booster material, and the surrounding gas-generating propellant are typically all confined within a metallic structure or assembly, the whole of which forms the "gas generator" which produces inflating gas for an inflatable component (such as an air bag in a passenger vehicle).

This gas generator assembly typically contains one or more internal chambers or baffles, as well as one or more internal sets of filters, which are designed to: (a) control the burn rate of the propellant and the gas mass flow rate, (b) reduce the temperature of the gases produced by the burning of the gas-generating material, and (c) filter out accelerated particles before the gases pass through vents in the assembly and into the airbag itself.

The gas generator is typically located in a position external to the inflatable component (e.g. an airbag) itself, and is attached to the inflatable component by a conduit through which the generated gases flow into the inflatable component, causing the inflatable component to deploy.

Such prior art systems are disclosed, for example, in U.S. Pat. No. 5,738,374 (a pyrotechnic gas generator for an air bag using an annular charge of a mixture of ammonium perchlorate and sodium nitrate, with a silicone binder); U.S. Pat. No. 5,623,115 (a gas generator including a pyrogen igniter enclosing a unitary grain of ignition material, with a squib located to ignite the unitary grain); U.S. Pat. No. 5,483,896 (a housing for a pyrotechnic inflator which serves as a filter for entrapping contaminants and as a cooler by absorbing heat from the generated gas); U.S. Pat. No. 5,443,286 (a gas generating cartridge surrounded by filtering and cooling screens); U.S. Pat. No. 4,200,615 (a linear igniter and pyrotechnic material extending longitudinally within an elongated enclosure); U.S. Pat. No. 4,950,458 (a two-stage gas generator, in which each stage includes a combustion chamber with an igniter); and U.S. Pat. No. 4,923,212 (a lightweight pyrotechnic inflator consisting of six component parts, including mechanical parts, a filter, a propellant assembly and an initiator).

Hybrid inflators such as the inflators disclosed in U.S. Pat. No. 5,670,738 (a hybrid inflator using compressed gas together with an initiator and a pyrotechnic gas generator), U.S. Pat. No. 5,660,412 (a hybrid inflator consisting of a pressure vessel containing a main charge of pyrotechnic material and a secondary charge of pyrotechnic material, wherein the secondary charge produces products of combustion that ignite the main charge), U.S. Pat. No. 5,588,676 (a hybrid inflator with a pyrotechnic gas generator and a gas chamber storing pressurized gas), U.S. Pat. No. 5,462,307 (a hybrid air bag inflator with a first chamber containing compressed gas and a second chamber containing an igniter and pyrotechnic material) and U.S. Pat. No. 5,131,680 (an inflator assembly which includes pyrotechnic material and a container of gas under pressure) also use gas generating units that are completely separate from and external to the inflatable component (e.g., the air bag) itself.

U.S. Pat. No. 6,062,143, which is assigned to the assignee of the present application and is incorporated herein by reference, discloses a distributed charge inflator. The distributed charge inflator generally includes a distributed gas-generating material, that may have a faster burning center core ignition material surrounded by supplemental propellant, or uses a homogenous mixture of ignition material and propellant, and also includes an initiator (e.g., an electronic squib) used to ignite the gas generating material upon a signal from an initiating device. The fast burning gas generating material or "distributed charge" is designed to be installed within and distributed along the interior of the undeployed inflatable component itself. It is not necessary to contain the distributed charge inflator (DCI) within any type of exterior housing or assembly. The distributed charge inflator is simpler and less expensive to manufacture than the prior art systems listed above, because it does not require the complicated series of chambers, baffles, or filters. Also, because distributed charge inflator is distributed, rather than confined to a small enclosed container as in the prior art systems listed above, it generates gases and releases the generated gases with far less explosive force than in the prior art systems. The internal distributed charge inflator system virtually eliminates the uneven inflations, pressure waves, and inertial effects of gases injected into the inflatable components from externally located gas generators. Moreover, the distributed charge inflator equipped inflatable restraints deploy less aggressively than existing systems because the energy of the expanding gases is essentially distributed uniformly throughout the inflatable structure during deployment.

Further, because the distributed charge inflator is distributed internally within the inflatable component, there is no necessity to reinforce the inflatable fabric or bladder material against pressure, heat and high velocity particulates at the point at which gases would have been forcefully injected into the inflatable component from the gas generator external to the inflatable component. Furthermore, there is no need for a reinforced fill tube, or other means for providing a secure conduit from the gas generator to the inflatable component.

An additional advantage is that it can be readily scaled to the particular application. Almost every different vehicle platform or different application requires a different volume of the inflating gas, or a different rate of inflation.

The distributed charge inflator is not limited to simply propagating the rapid ignition of other materials, the burning of which then produces the quantities of gas necessary to inflate a given structure. The distributed charge inflator system is a complete, autonomously-operating inflation system.

Example of inflatable components which the distributed charge inflator can be used to inflate are described in U.S. Pat. No. 5,282,648 (body and head restraints); U.S. Pat. No. 5,322,322 (side impact head strike protection); U.S. Pat. No. 5,480,181 (side impact head strike protection); and U.S. Pat.

No. 5,464,246 (tubular cushions), which are incorporated herein by reference, as well as automotive air bags and other inflatable products.

SUMMARY OF THE INVENTION

The present invention is an improved inflator system that can be used in conjunction with a wide variety of inflatable systems such as inflatable restraint systems, inflatable flotation systems, or passive inflatable safety systems.

An inflatable system of the present invention includes an inflatable component and a distributed charge inflator disposed in the inflatable component. The distributed charge inflator includes a housing body and a distributed charge connected to the housing body. Upon receiving a signal from a sensor, an initiator in the housing body ignites the distributed charge, thus inflating the inflatable component.

The housing body may also include a sustainer having a longer burn time than the distributed charge. The initiator ignites the distributed charge and the sustainer simultaneously upon receiving the signal from the sensor. The distributed charge combusts over a first time interval to inflate the inflatable component and the sustainer combusts over a second time interval to maintain the inflation of the inflatable component. Optionally, the housing body may include a booster to help the ignition of the distributed charge. The booster may be loosely placed within the housing body. Alternatively, the booster may be compressed in a container that is placed around the initiator in the housing body.

The distributed charge inflator of the present invention may be used in a side impact protection system. In one embodiment, the distributed charge inflator includes a housing body and more than one distributed charge having different deployment characteristics. The distributed charge inflator is disposed in an inflatable component of the side impact protection system. Each of the distributed charges is disposed in different sections (e.g., chambers) of the inflatable component. The distributed charges, having different deployment characteristics, disposed in the different sections of the inflatable component may cause the different sections of the inflatable component to be inflated with different deployment characteristics, such as different timing, different pressures and/or different burn rates. The distributed charges may assume any shape. The distributed charges do not need to be uniformly (or evenly) distributed within the sections of the inflatable component.

The distributed charge inflator of the present invention may also be used in a front impact protection system. The distributed charge inflator including a distributed charge and a housing body is disposed in an inflatable component of the front impact protection system. The distributed charge may assume any shape. The distributed charge does not need to be uniformly (or evenly) distributed within the inflatable component.

BRIEF DESCRIPTION OF THE DRAWINGS

FIG. 1 is a schematic diagram of an inflatable system according to a preferred embodiment of the present invention.

FIG. 2 is a schematic diagram of an exemplary inflatable system according to a preferred embodiment of the present invention.

FIG. 2*a* is a cross-sectional view of the exemplary inflatable system in FIG. 2.

FIG. 3 is a cross-sectional view of an exemplary distributed charge inflator according to a preferred embodiment of the present invention.

FIGS. 4, 5 and 6 are schematic diagrams of exemplary implementations of the present invention.

DETAILED DESCRIPTION OF THE INVENTION

Figure 6:
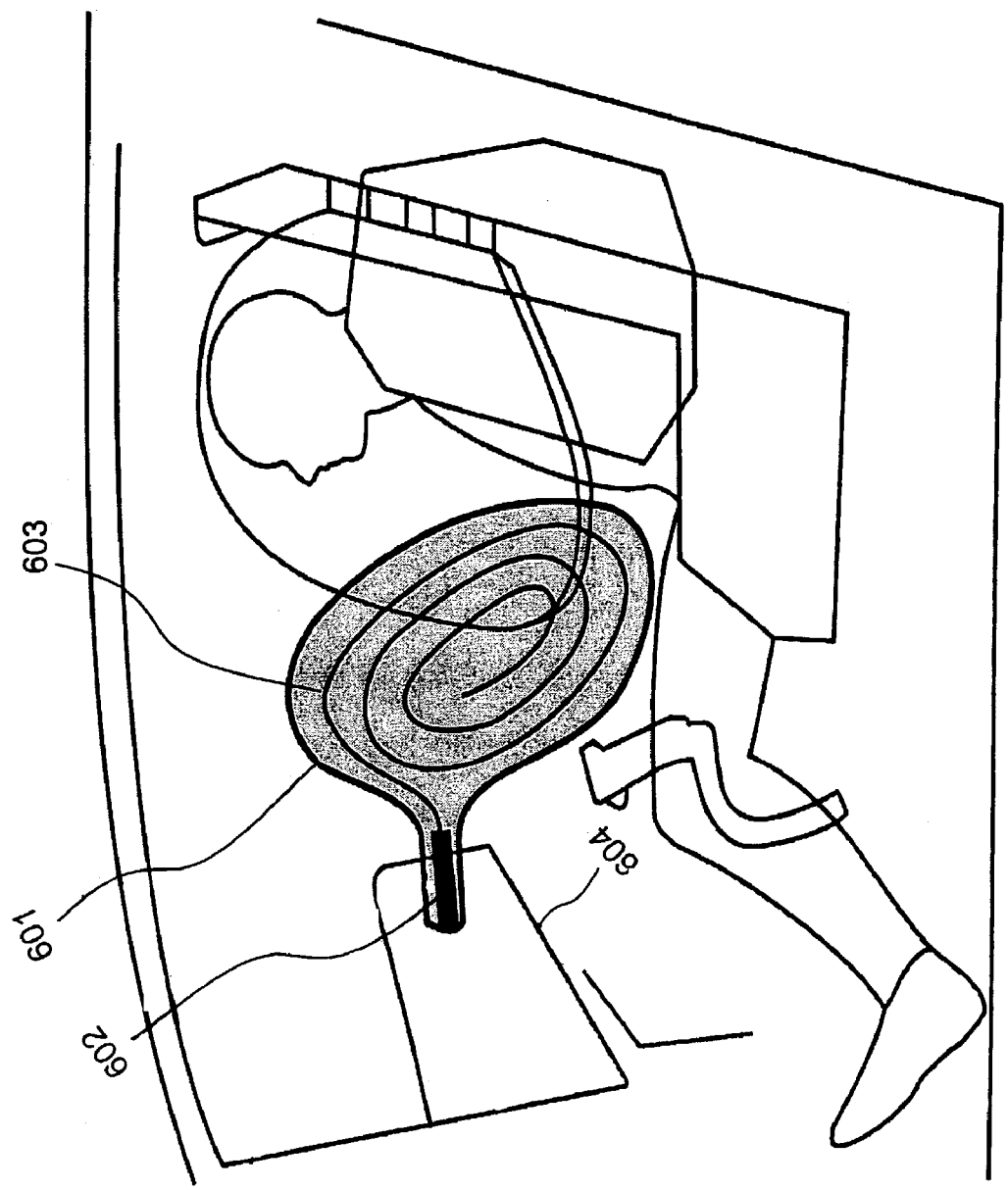

Reference will now be made in detail to the preferred embodiments of the present invention, examples of which are illustrated in the accompanying drawings.

FIG. 1 shows an inflatable system according to a preferred embodiment of the present invention.

Inflatable system 100 includes an inflatable component 101 and a distributed charge inflator 110 disposed in inflatable component 101. Distributed charge inflator 110 includes a housing body 102 and a distributed charge 104 connected to housing body 102. Distributed charge 104 may be a solid monolithic block of pyrotechnic materials formed into the desired configuration using binders. The pyrotechnic material (with or without binders) may be enclosed by an exterior sheath, layer or coating for environmental protection. Alternatively, the distributed charge may include a core of ignition material and a sheath. Optionally, the distributed charge may also include a gas generating layer or coating. Housing body 102 includes an initiator for igniting the distributed charge. Housing body 102 may also include a sustainer that exhibits relatively long burn time. Housing body 102 may be any type of inflator. The housing body may be a compressed gas inflator or a hybrid inflator.

Inflatable system 100 receives an electric signal from an activator along a wire 103, when a crash sensor or other activator determines that the inflatable component must be deployed. Upon receiving the electrical signal, the initiator in the housing body ignites distributed charge 104, generates inflating gas, thus deploying inflatable component 101. Simultaneously, the initiator may also ignite the sustainer in the housing body, thus sustaining the inflation of the inflatable component.

FIG. 2 shows an exemplary inflatable system according a preferred embodiment of the present invention.

Inflatable system 200 includes an inflatable component 201 and a distributed charge inflator 210 disposed in inflatable component 201. Distributed charge inflator 210 includes a housing body 202 and a distributed charge 204 connected to housing body 202. FIG. 2A shows a cross-sectional view of inflatable system 200. As shown, housing body 202 includes an initiator 230 and a sustainer 205. Sustainer 205 is held and supported by a retaining ring 220 and a spring 222 in housing body 202. Spring 222 accommodates for different loads of sustainer 205 to suit the specific application. Other elastic materials or mechanisms can be used as alternatives to spring 222. Housing body 202 also includes a nozzle screen 232 and a ferrule 234. Nozzle screen 232 retains sustainer 205 in housing body 202. Ferrule 234 joins housing body 202 to distributed charge 204 by mechanically holding the distributed charge. Ferrule 234 also controls the output of the housing body.

Initiator 230 ignites both of sustainer 205 and distributed charge 204. Combustion of distributed charge 204 generates a high volume of gas which inflates inflatable component 201 from stowed to deployed conditions. The distributed charge typically combusts over a relatively short time interval (typically between 1 and 20 ms, preferably 5 ms). To maintain inflation of the inflatable component, the sustainer is provided to combust over a relatively longer interval (typically between 50 to 500 ms, preferably 200 ms). The gas generated from combustion of the sustainer can be vented from the housing body through the ferrule.

Optionally, housing body 202 may include a booster (not shown) to help the ignition of the distributed charge. The booster may be loosely placed within the housing body. Alternatively, the booster may be compressed in a container and placed in the housing body. FIG. 3 shows an exemplary embodiment of the distributed charge inflator including the booster compressed in a container. As shown, a housing body 302 of distributed charge inflator 310 includes an initiator 320 and a booster 333 compressed in a container 330. Container 330 may be placed around initiator 320, thus forming a "micro gas generator." The micro gas generator eliminates the need for a booster assembly packet that is used with the booster loosely placed within the housing body, thus simplifying assembly of the housing body. Further, since the booster is compressed, the booster combusts more efficiently than the loosely placed booster. Boron potassium nitrate ($BKNO_3$), for example, may be used as the booster.

The length of the time intervals over which the distributed charge and the sustainer are combusted can be selected for the particular application. For example, the inflatable component for a side impact protection system for a sports utility vehicle needs to become fully inflated within 15 ms, and needs to remain inflated for at least 2.5 seconds, preferably as long as 7 seconds or more so that it can protect its occupants in a rollover. Preferably, the inflatable component for front impact protection system should become fully inflated within 30 ms and should remain inflated for 100 ms.

The distributed charge in the distributed charge inflator may be manufactured in various sizes and configurations, depending upon the inflation requirements of the system for which it is intended. These may range from a foil or thin film, or linear or tubular shaped charges to broad flat sheets of distributed charge material which may be cut, trimmed, or otherwise fitted. For example, distributed charge 104 in FIG. 1 and distributed charge 204 in FIG. 2 are configured as linear charges.

Further, the distributed charge inflator of the present invention can be designed so that, depending on deployment characteristics of the distributed charges or the pattern of distribution of the distributed charges within a given inflatable system, different sections of the inflatable component can be inflated with different deployment characteristics, such as different timing, different pressures and/or different burn rates.

FIGS. 4, 5 and 6 show examples of implementations of the present invention.

FIG. 4 shows an exemplary implementation of the distributed charge inflator of the present invention in a side impact protection system. As shown, the distributed charge inflator includes a housing body and more than one linear charge (i.e., a distributed charge in linear configuration) connected to the housing body. The distributed charge inflator includes housing body 402 and linear charges 403 and 404 connected to housing body 402. Housing body 402 includes an initiator for igniting the linear charges. Housing body 402 may also include a sustainer. The distributed charge inflator is disposed in inflatable component 401 of the side impact protection system. The inflatable component of the side impact protect system includes multiple sections (or chambers). For example, inflatable component 401 includes sections 410 and 412. Each of the linear charges is disposed in each of the multiple sections of the inflatable component. Linear charge 403 is disposed in section 410 and linear charge 404 is disposed in section 412 of inflatable component 401. The linear charges may assume any shape. For example, the linear charges may be coiled, as shown in FIG. 4, or straight or knotted. FIG. 5 illustrates linear charge 403 with different shape. Linear charges 403 and 404 are configured to have different deployment characteristics so that the sections of the inflatable component can be inflated with different timing, different pressures and/or different burn rates, depending upon the inflation requirements of the system for which it is intended. The length of the linear charges can be selected so as to control the deployment time and the pressure of different sections of the inflatable component. The linear charges may be formed of different materials or composition having different burn rates. The linear charges may also be in different shapes.

The initiator in housing body 402 ignites both of linear charges 403 and 404 upon receiving a signal from an activator. Ignition of linear charge 403 and 404 causes inflation of inflatable component 401 with sections 410 and 412 inflating with different timing and/or different pressures. By providing the linear charges having different deployment characteristics in the different sections of the inflatable component, the inflatable component can be inflated with the different sections of the inflatable component inflating with different deployment characteristics, such as different timing, different pressures and/or different burn rates depending upon the inflation requirements of the system for which it is intended. The sections of the inflatable component that inflates fast, for example, can provide protection for rapid crash event, such as a primary impact, and the sections of the inflatable component that inflates slowly and has a long burn time can provide protection for slower developing crash events, such as a rollover.

The linear charge does not need to be uniformly (or evenly) distributed within the section of the inflatable component. Even without the linear charge evenly distributed in the inflatable component, the distributed charge inflator of the present invention provides advantages over the prior art systems. The distributed charge inflator of the present invention is still simpler and less expensive to manufacture than the prior art systems because it does not require the complicated series of chambers. Also, because the linear charge is not confined to a small enclosed container, it generates gases and releases the generated gases with far less explosive force than in the prior art systems. Further, when the linear charge is disposed within the inflatable component, there is no necessity to reinforce the inflatable fabric. Furthermore, there is no need for a reinforced fill tube, or other means for providing a secure conduit from the gas generator to the inflatable component.

FIG. 6 shows an exemplary implementation of the distributed charge inflator of the present invention in a front impact protection system. The distributed charge inflator includes a housing body 602 and a linear charge 603 connected to the housing body. The distributed charge inflator is disposed in an inflatable component 601. Linear charge 603 may assume any shape. In FIG. 6, for example, linear charge 602 is coiled. The linear charge does not need to be evenly distributed within the inflatable component. The front impact protection system may be mounted in an instrument panel 604 of an automobile.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. An inflatable system comprising:
    a. an inflatable component;
    b. a first charge for generating inflating gas and having a first burn time; and
    c. a housing body (i) including an initiator and a second charge for generating inflating gas and (ii) connected to the first charge, wherein the first charge and the housing body are disposed in the inflatable component with at least a substantial portion of the first charge outside the housing, the inflatable component comprises expandable material surrounding at least the first charge, the initiator ignites the first charge and generates inflating gas which inflates the inflatable component, and the initiator ignites the second charge which has burn time longer than the first burn time.

2. The inflatable system of claim 1, wherein the initiator ignites the first charge and the second charge simultaneously.

3. The inflatable system of claim 1, wherein the first charge inflates the inflatable component and the second charge maintains the inflation of the inflatable component.

4. The inflatable system of claim 1, wherein the system further includes a third charge to boost the ignition of the first charge.

5. The inflatable system of claim 4, wherein the third charge is compressed in a container.

6. The inflatable system of claim 5, wherein the container is placed around the initiator in the housing body.

7. The inflatable system of claim 1, wherein the first charge is a solid monolithic block of pyrotechnic materials in linear configuration.

8. The inflatable system of claim 1, wherein the system includes a plurality of the first charges connected to the housing body and the inflatable component includes a plurality of sections.

9. The inflatable system of claim 8, wherein the initiator ignites the plurality of the first charges.

10. The inflatable system of claim 8, wherein each of the plurality of the first charges is disposed in each of the plurality of sections of the inflatable component.

11. The inflatable system of claim 10, wherein the plurality of the first charges has different deployment characteristics and the ignition of the plurality of the first charge causes inflation of the plurality of sections of the inflatable component with different deployment characteristics.

12. The inflatable system of claim 11, wherein the different deployment characteristics include different timing, different pressures or different burn rates.

13. The inflatable system of claim 11, wherein the deployment characteristics are determined by a shape, a length or a composition of the first charge.

14. The inflatable system of claim 1, wherein the second charge has a slower gas onset rate than the first charge.

15. The inflatable system of claim 1, wherein the initiator initiates the first charge and the second charge simultaneously.

16. The inflatable system of claim 4, wherein the second charge is compressed in a container.

17. The inflatable system of claim 6, wherein the container is placed adjacent the initiator in the housing body.

* * * * *